United States Patent [19]

Abe et al.

[11] Patent Number: 5,270,805

[45] Date of Patent: * Dec. 14, 1993

[54] DATA COMMUNICATION APPARATUS FOR CONVERTING DATA IN ACCORDANCE WITH A DISCRIMINATED FUNCTION OF A DESTINATION STATION

[75] Inventors: Shintaro Abe, Fuzisawa; Kaoru Nakamura, Hachiouzi, both of Japan

[73] Assignee: Canon Kabushiki Kaisha, Tokyo, Japan

[*] Notice: The portion of the term of this patent subsequent to May 1, 2007 has been disclaimed.

[21] Appl. No.: 444,305

[22] Filed: Dec. 1, 1989

Related U.S. Application Data

[62] Division of Ser. No. 150,659, Jan. 13, 1988, which is the national phase of PCT/JP87/00310, May 16, 1987.

[30] Foreign Application Priority Data

May 16, 1986 [JP] Japan .............................. 61-112063
Nov. 1, 1986 [JP] Japan .............................. 61-261128

[51] Int. Cl.⁵ ............................................. H04N 1/415
[52] U.S. Cl. ...................................... 358/500; 358/433
[58] Field of Search .............. 358/433, 434, 435, 436, 358/470, 456, 425, 429, 426, 75, 298; 382/56

[56] References Cited

U.S. PATENT DOCUMENTS

| | | |
|---|---|---|
| 4,144,547 | 3/1979 | Stoffel . |
| 4,194,221 | 3/1980 | Stoffel . |
| 4,668,995 | 5/1987 | Chen et al. . |
| 4,672,459 | 6/1987 | Kudo . |
| 4,680,642 | 7/1987 | Shimano et al. . |
| 4,694,352 | 9/1987 | Ina et al. ............................ 358/426 |
| 4,750,044 | 6/1988 | Nakajima . |
| 4,750,209 | 6/1988 | Shimura et al. . |
| 4,829,385 | 5/1989 | Takezawa ........................... 358/433 |
| 4,922,349 | 5/1990 | Abe et al. ........................... 358/443 |

FOREIGN PATENT DOCUMENTS 0053469 9/1982 European Pat. Off. .

OTHER PUBLICATIONS

Computers & Graphics, vol. 7, No. 1, 1983, pp. 13-29, Horak.

Globecom '85, IEEE Global Telecom. Conf., Dec. 1985, vol. 1, pp. 4.7.1-4.7.8-, IEEE, Yamazaki.

Primary Examiner—Edward L. Coles, Sr.
Assistant Examiner—Kim Yen Vu
Attorney, Agent, or Firm—Fitzpatrick, Cella, Harper & Scinto

[57] ABSTRACT

When data communication is to be performed, character code data and image data are divided into different block areas, the block area of the image data is further divided into block areas in accordance with image characteristics of the image data, and the data of the respective block areas are communicated, thereby efficiently communicating the data.

7 Claims, 8 Drawing Sheets

DATA COMMUNICATION APPARATUS FOR CONVERTING DATA IN ACCORDANCE WITH A DISCRIMINATED FUNCTION OF A DESTINATION STATION

This application is a division of application Ser. No. 150,659 filed Jan. 13, 1988, which is the national phase of PCT application No. PCT/JP87/00310, filed May 16, 1987.

TECHNICAL FIELD

The present invention relates to a data communication apparatus for communicating data such as image data and character code data.

BACKGROUND ART

Known examples of a conventional communication apparatus of this type are a facsimile apparatus for communicating image data and a Telex for communicating character code data.

However, the facsimile apparatus can communicate only image data, and the Telex can communicate only character code data. For this reason, when data including both image and character code data is to be transmitted, data communication efficiency is degraded because the character code data is transmitted as the image data.

In order to eliminate the above drawback, image data and character code data may be divided into different block areas so that the respective block areas can be transmitted independently of each other, to thereby improve data communication efficiency. However, some image data, e.g., halftone image data and color image data, have a variety of image characteristics. Therefore, if such image data is communicated as one block, an image data amount is increased or image data processing is complicated, resulting in poor communication efficiency.

DISCLOSURE OF THE INVENTION

It is an object of the present invention to provide a data communication apparatus which eliminates the above drawback.

It is another object of the present invention to provide a data communication apparatus which divides data into block areas in accordance with data characteristics and communicates the data in units of the block areas.

It is still another object of the present invention to provide a data communication apparatus which divides character code data and image data into different blocks, further divides an image data block in accordance with image characteristics, and communicates the data in units of the blocks.

It is still another object of the present invention to provide a data communication apparatus which converts data in accordance with the type of a destination apparatus and communicates the data.

It is still another object of the present invention to provide a data communication apparatus which divides character code data and image data into different blocks, further divides an image data block in accordance with image characteristics such as a halftone image or a color image, and communicates the data.

It is still another object of the present invention to provide a data communication apparatus which converts halftone image data into binary image data and communicates the data when a destination apparatus does not have a halftone image data processing function but has only a binary image data processing function.

It is still another object of the present invention to provide a data communication apparatus which converts color image data into monochromatic image data and communicates the data when a destination apparatus does not have a color image data processing function but has only a monochromatic image data processing function.

The other objects of the present invention will be apparent from the following embodiments.

BEST MODE OF CARRYING OUT THE INVENTION

An embodiment of the present invention will be described in detail with reference to the accompanying drawings.

Figure 1:
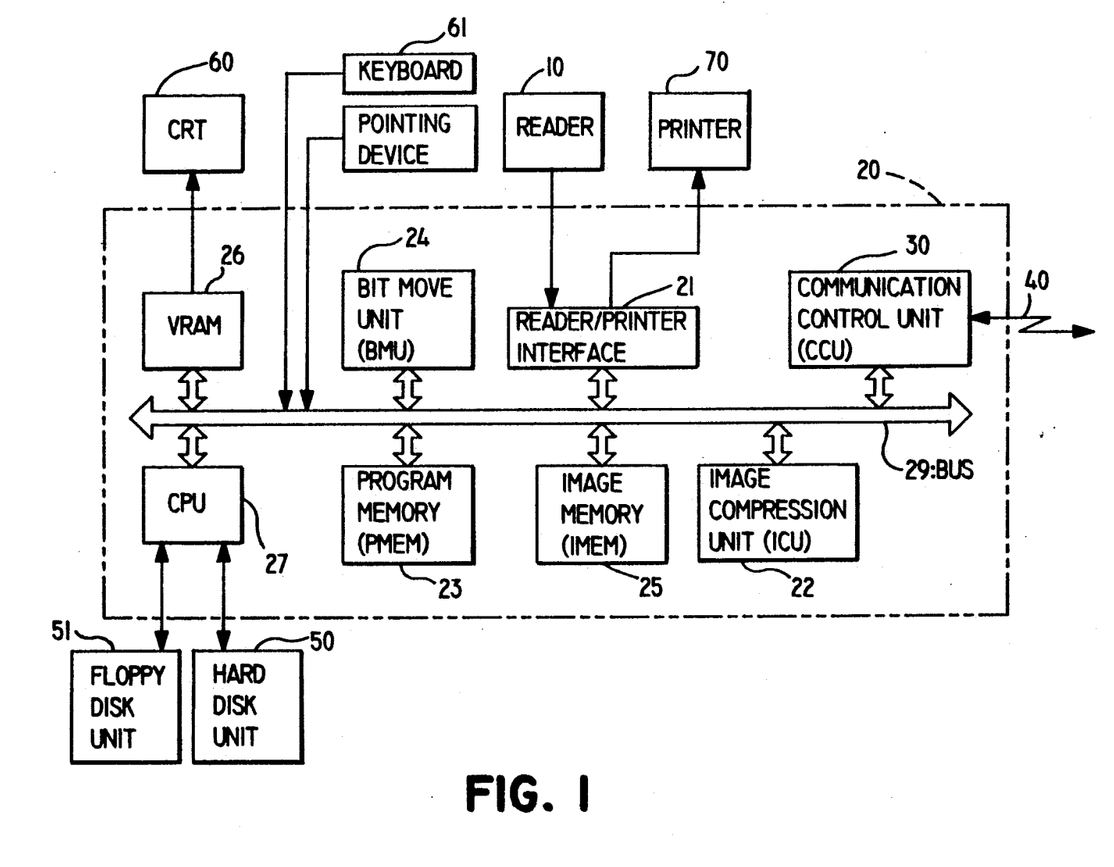
FIG. 1 is a block diagram of an arrangement according to an embodiment of the present invention.
Figure 2:
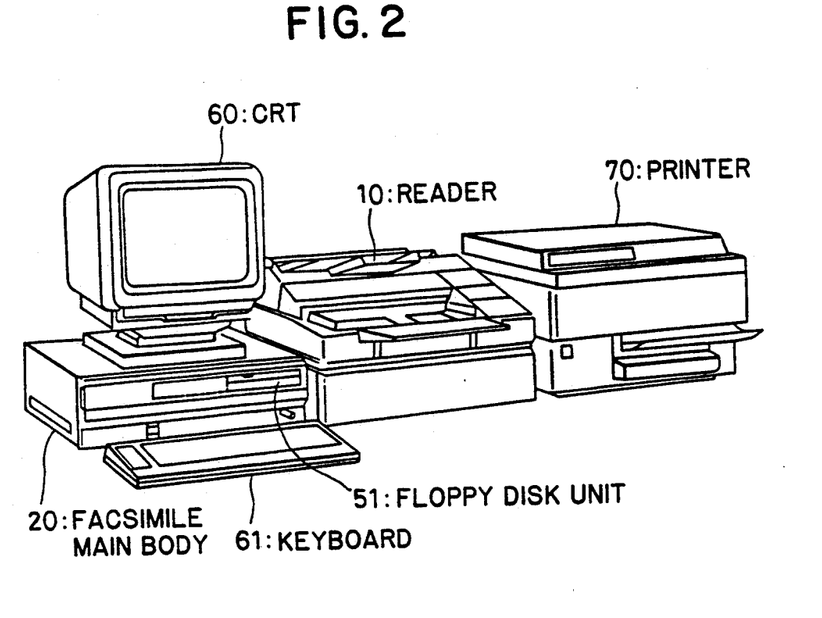
FIG. 2 is a perspective view of a data communication apparatus of the embodiment.

FIG. 1 is a block diagram of an embodiment of the present invention, and FIG. 2 is a perspective view thereof.

In FIGS. 1 and 2, a reader 10 reads a predetermined original and outputs an electrical signal.

The reader 10 can discriminate a binary image area from a halftone image area such as a photograph and has an image processing function of, e.g., reading the latter by a dither pattern or the like.

A facsimile main body 20 comprises a reader/printer interface 21, an image compression unit (to be referred to as "ICU" hereinafter) 22, a program memory (to be referred to as "PMEM" hereinafter) 23, a bit move unit (to be referred to as "BMU" hereinafter) 24, an image memory (to be referred to as "IMEM" hereinafter) 25, a video RAM (to be referred to as "VRAM" hereinafter) 26, a central processing unit (to be referred to as "CPU", hereinafter) 27, a bus 29, and a communication control unit (to be referred to as "CCU" hereinafter) 30.

The ICU 22 compresses and expands data, and in order to increase coding efficiency, two-dimensional compression (high compression) is adopted. The PMEM 23 has an OS (Operation System) program for controlling peripheral input/output apparatuses of the facsimile main body 20 and the respective units provided therein, an application program memory area, and a font memory area for converting a character code into image data.

The PMEM 23 also has a memory management unit (MMEU), and a work area as a transfer data buffer for transmitting data from a hard disk through the CCU 30 or storing the data from the CCU 30 into the hard disk. Note that the above buffer matches speeds of a disk, a line, and the like. In addition, the PMEM 23 stores code data of a document input from a keyboard 61.

The BMU 24 edits an image (performs image processing) on the CRT 60, i.e., enlarges, reduces, rotates, moves, or cuts a predetermined image.

The IMEM 25 has 4 Mbytes and stores an image from the reader, an image edited by the BMU 24, data expanded by the ICU 22, and data obtained by converting a character code into an image. One page of the document information mixture is constituted by an addition of a block of bit image data and a block of character code data. Each block data is given with an identification code and an attribute code representing a block position and is stored in the PMEM and the IMEM. Note that the attribute code may be given to each data when the data is transferred.

The VRAM 26 stores image data to be displayed on the CRT 60 by a bit map code.

As external memory units, a hard disk unit 50 and a floppy disk unit 51 are provided. These units are nonvolatile memories, but a backup memory may be used as a nonvolatile memory.

Characters and the like are input using the keyboard 61, and a position on the CRT 60 is designated using a cursor. In addition, a pointing device 62 and a printer 70 are provided.

According to this embodiment having the above arrangement, image data and character code data are divided into blocks and then communicated. Furthermore, in the image data, a binary image area and a halftone image area (or a very fine binary image area) are divided into different blocks, subjected to compression processing corresponding to the respective areas, and then communicated.

Figure 5:
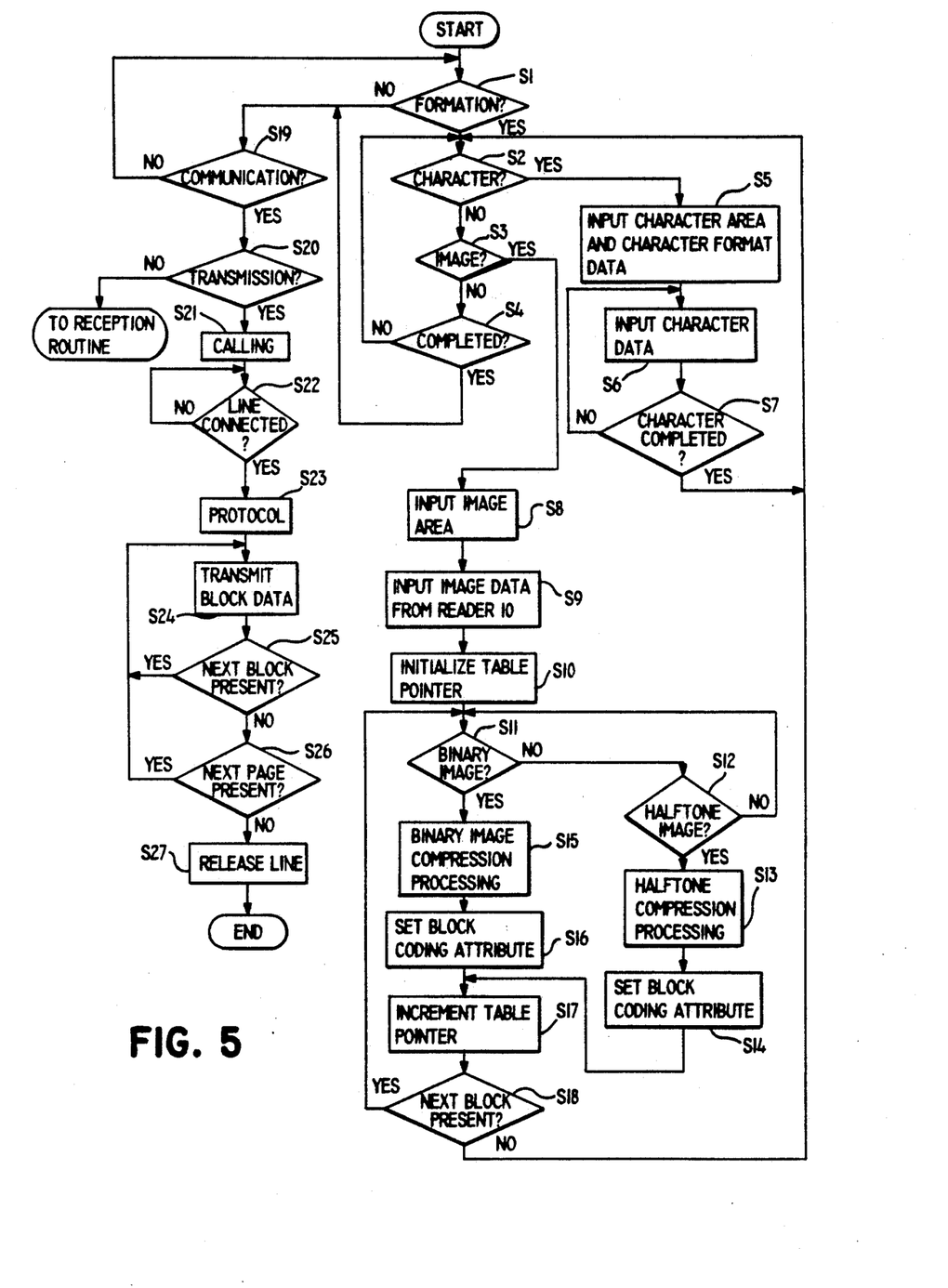
FIG. 5 is a flow chart of the embodiment.

FIG. 5 is a flow chart for explaining a control operation of the CPU 27 of this embodiment.

The CPU 27 determines in steps S1 and S19 of FIG. 5 whether data is to be formed or communicated.

When data is to be formed, an operator sets the apparatus in a data formation mode using the keyboard 61, and when data is to be transmitted, the operator sets the apparatus in a data transmission mode at the keyboard 61. In step S19, the CPU 27 determines the presence/absence of a ringing signal from a line.

When the data is to be formed, the flow advances from step S1 to S2. However, when the data is to be communicated, the flow advances from step S19 to S20.

In steps S2 and S3, the CPU 27 determines whether the data to be formed is character data or image data. In order to form data, the operator forms original data in units of pages while observing display contents on the CRT 60. At this time, a page of all character data, a page of all image data, or a page of a mixture of character and image data can be formed. The operator instructs with the keyboard 61 whether data to be input is character data or image data and sets the apparatus in a character input mode or an image input mode. The CPU 27 determines in steps S2 and S3 whether the character input mode or the image input mode is set.

If the CPU 27 determines in step S2 that the character input mode is set, area data (a block area) in which the character data is input and a format of characters (sizes or an arrangement of the characters) of one page are input in step S5. These area and format data are input by the operator through the keyboard 61 and the pointing device 62.

The character area and character format data input in step S5 are stored together with the character data input in steps S6 and S7 in the PMEM 23 as block data.

If the CPU 27 determines in step S3 that the image input mode is set, the flow advances to step S8. In step S8, block area data in which the image data is to be input is input.

Figure 3:
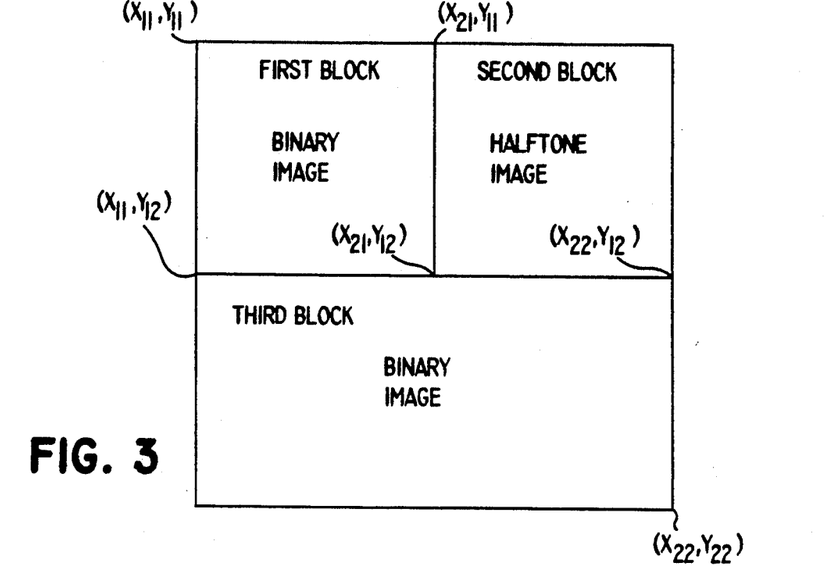
FIG. 3 is a schematic view of image data.
Figure 4:
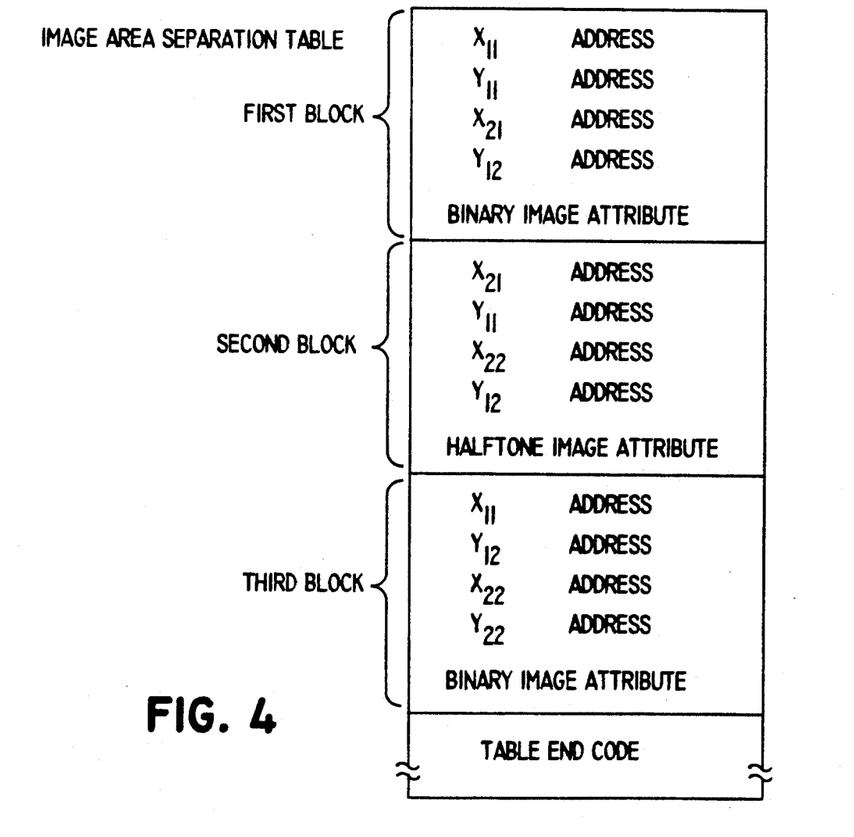
FIG. 4 is a schematic view of an image area separation table.

In step S9, the image data of an original read by the reader 10 are input and sequentially stored in the IMEM 25, and image area separation data is formed in the PMEM 23 on the basis of image area data supplied together with the image data from the reader 10. When the reader 10 reads an original as shown in FIG. 3, it outputs address data (X,Y) and image attribute data (e.g., data representing whether the image is a binary one or a halftone one) of an image area of the image together with the image data through the reader/printer interface 21. The CPU 27 stores the image data in the IMEM 25 and at the same time, forms an image area separation table as shown in FIG. 4 in the PMEM 23 on the basis of the address and image attribute data supplied from the reader 10.

In step S10, a pointer is set at a start block of the image area separation table of the PMEM 23.

In steps S11 and S12, the CPU 27 determines whether the block is a binary image or a halftone image. If the block is a binary image, the CPU 27 performs binary image compression processing such as MH (Modified Huffman) coding, MR (Modified READ) coding, MMR (Modified Modified READ) coding, or the like in step S15. In step S16, the CPU 27 sets block coding attribute data (e.g., data representing that the block is coded by the MH and MR) in the block, and then the flow advances to step S17.

On the other hand, if the CPU 27 determines in step S12 that the block is a halftone image, it performs halftone compression processing such as dither pattern compression processing, or does not perform compression processing (e.g., performs noncompression processing). Then, the CPU 27 sets block coding attribute data in the block in step S14 as in step S16 and increments a table pointer in step S17. Thereafter, if the CPU 27 determines in step S18 that the next block is present, the flow returns to step S11.

When the image data compression processing is completed and the block data is formed as described above, the flow returns from step S18 to step S2. The data thus formed is added with an original name and then stored in the hard disk unit 50.

When the original data of one page is formed in steps S2 to S18, the operator inputs information representing completion of an original of one page by the keyboard 61 and the pointing device 62. If an original of the next page is to be formed, the operations in steps S2 to S18 are repeated to form original data. When formation of transmission data is completed, the operator inputs information representing data formation completion by the keyboard 61.

If the CPU 27 determines in step S4 that the data formation completion information is input, the flow advances from step S4 to step S19.

When the operator selects the data communication mode, the flow advances from step S19 to step S20, and the CPU 27 determines whether data is to be transmitted. If Y (YES) in step S20, the flow advances to step S21. If the data is to be received, the flow advances to a reception routine.

In order to transmit the data, the operator inputs a name of an original to be transmitted and designates the original to be transmitted from the original data stored in the hard disk 50. Then, the operator inputs a telephone number of a destination apparatus to which the original data is to be transmitted.

In order to connect a line to the destination apparatus designated by the operator, dialing of the telephone number is performed to a line 40 by the CCU 30. When the CPU 27 determines in step S22 that the line is connected to the destination apparatus, it performs a communication procedure (protocol) recommended by the CCITT (International Consultative Committee for Telephone and Telegraph) with respect to the destination apparatus. In this protocol, the CPU 27 determines whether the destination apparatus can receive a data mixture of character code and image data. If the CPU 27 determines Y, the data is transmitted to the destination apparatus.

In steps S24, S25, and S26, originals to be transmitted are read out from the hard disk 50 in units of pages, and data of one page is transmitted in units of blocks. When original data transmission is completed in this manner, the line is disengaged from the destination apparatus in step S27.

Figure 6:
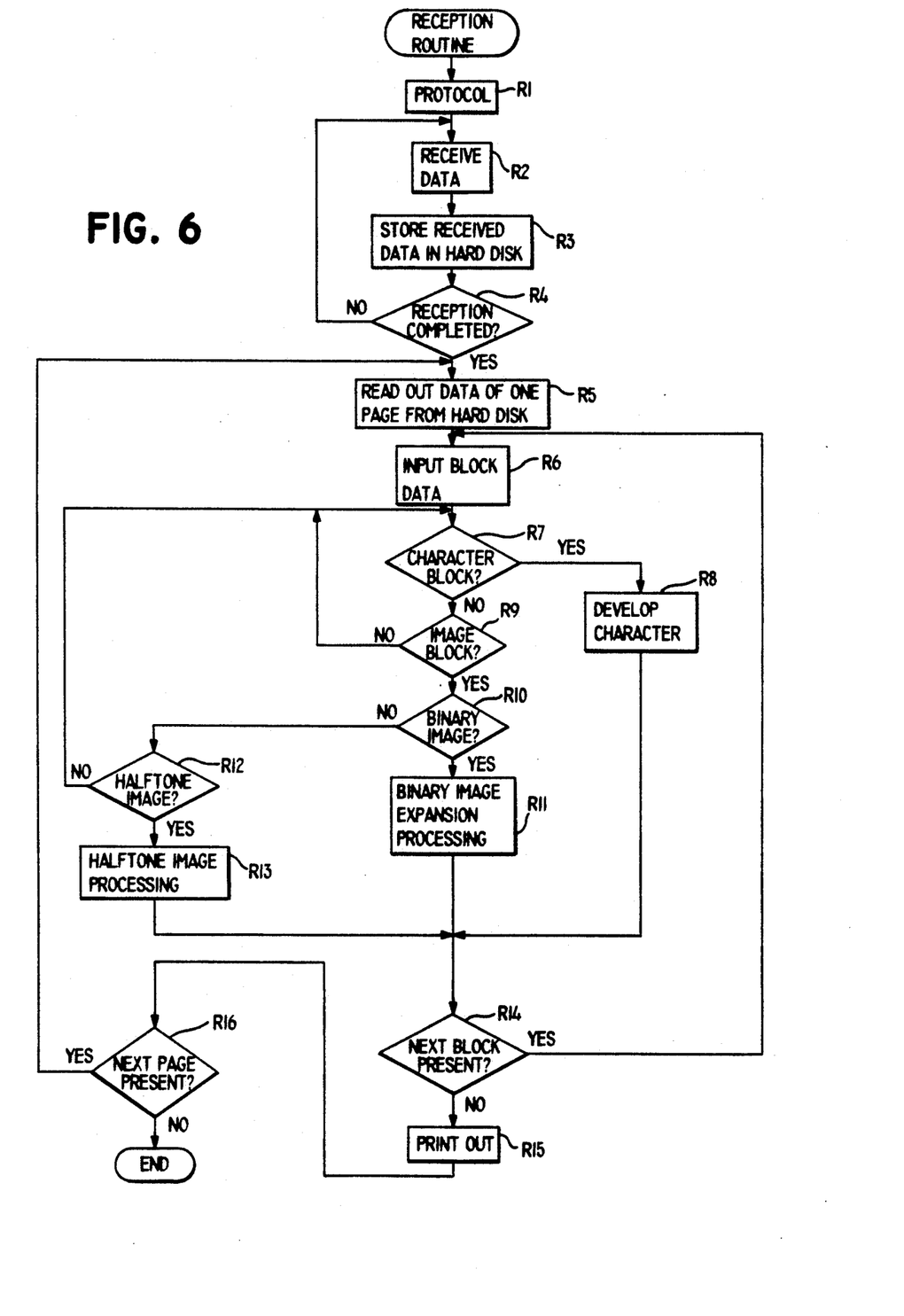
FIG. 6 is a flow chart of a reception routine.

FIG. 6 is a flow chart for explaining a control operation of the CPU 27 when data is to be received.

If the CPU 27 determines in step S20 of FIG. 5 that data is to be received, the flow advances to the reception routine of FIG. 6. In step R1 of FIG. 6, the CPU 27 performs the protocol recommended by the CCITT. If the CPU determines in this protocol that data can be received, it sets a reception mode determined by the protocol, receives data in steps R2, R3, and R4, and stores the received data sequentially in the hard disk 50. When data reception is completed, the CPU 27 disengages the line from the source apparatus and prints out the received data in steps from step R5.

In step R5, the CPU 27 reads out the received data of one page from the hard disk 50 and stores it in the PMEM 23. In step R6, the CPU 27 inputs block arrangement data representing blocks which constitute the data of one page, and in order to develop data into dot data in units of blocks, inputs data of one block.

If the CPU 27 determines in step R7 that the input block data is character code data, it develops the character code into dot data by a character generator of the PMEM 23 on the basis of the address data and the format data added to the block data in step R8 and stores the data in an area of the IMEM 25 corresponding to the block.

The CPU 27 determines in step R9 whether the input block data is image data and determines in steps R10 and R12 whether the image data is binary image data or halftone image data. If the image data is a binary image data, the CPU 27 performs expansion processing (e.g., decoding of the MH, MR, or MMR) on the basis of block coding attribute data in step R11 and stores the the expanded image data in an area of a memory of one page in the IMEM 25 corresponding to the block.

If the CPU 27 determines in step R12 that the image data is halftone image data, it performs expansion processing corresponding to the halftone image in step R13 as in step R11 and stores the expanded data in a block area of the IMEM 25 (in this case, if the halftone image is not compressed, it stores the data directly in the IMEM 25).

As described above, the character code and image data are developed into the dot data in units of blocks, development of all the block data which constitute one page is completed in step R14, and the dot data of an original of one page are stored in the IMEM 25. Then, in step R15, the CPU 27 sequentially reads out the dot data from the IMEM 25 and prints out the data using the printer 70. When the data of one page is printed out, data of the next page is printed out.

As described above, according to the present invention, if an original includes both character code and image data, the character code and image data are divided into different blocks and then transmitted (received), and the image data block is further divided into blocks of an binary image and a halftone image (or a very fine image or a complex image) so that compression processing can be performed in correspondence to the halftone image or the binary image. Therefore, data transfer can be performed more efficiently as compared with a case wherein the data is simply divided into the image data and the character code data. Note that in this embodiment, the binary image area and the halftone image area in the image data are automatically divided. However, these areas may be manually divided by the operator using the keyboard 61 and the pointing device 62.

Figure 7:
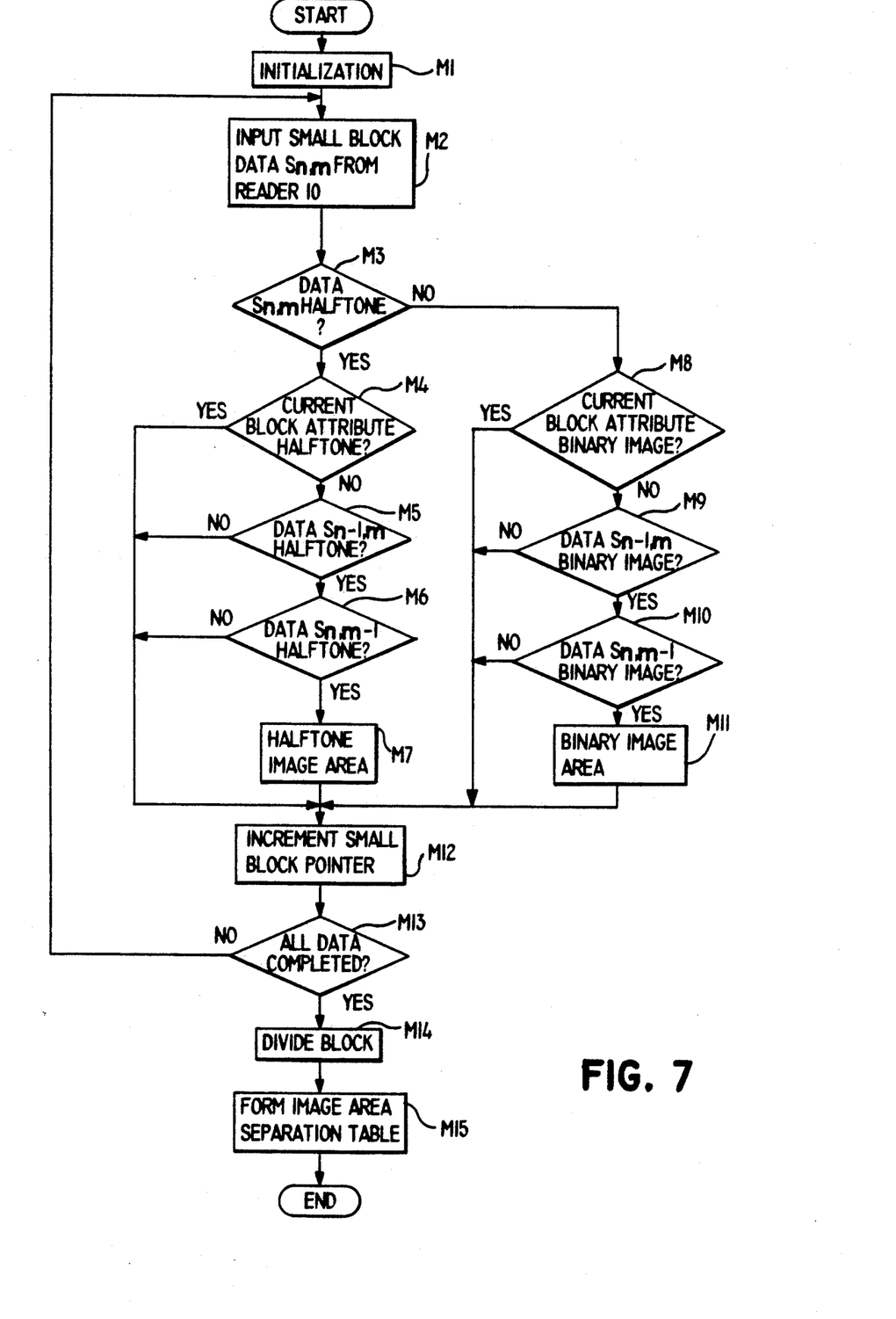
FIG. 7 is a flow chart for automatically dividing an image area.

FIG. 7 is a flow chart for automatically dividing a binary image area and a halftone image area.

Figure 8A:
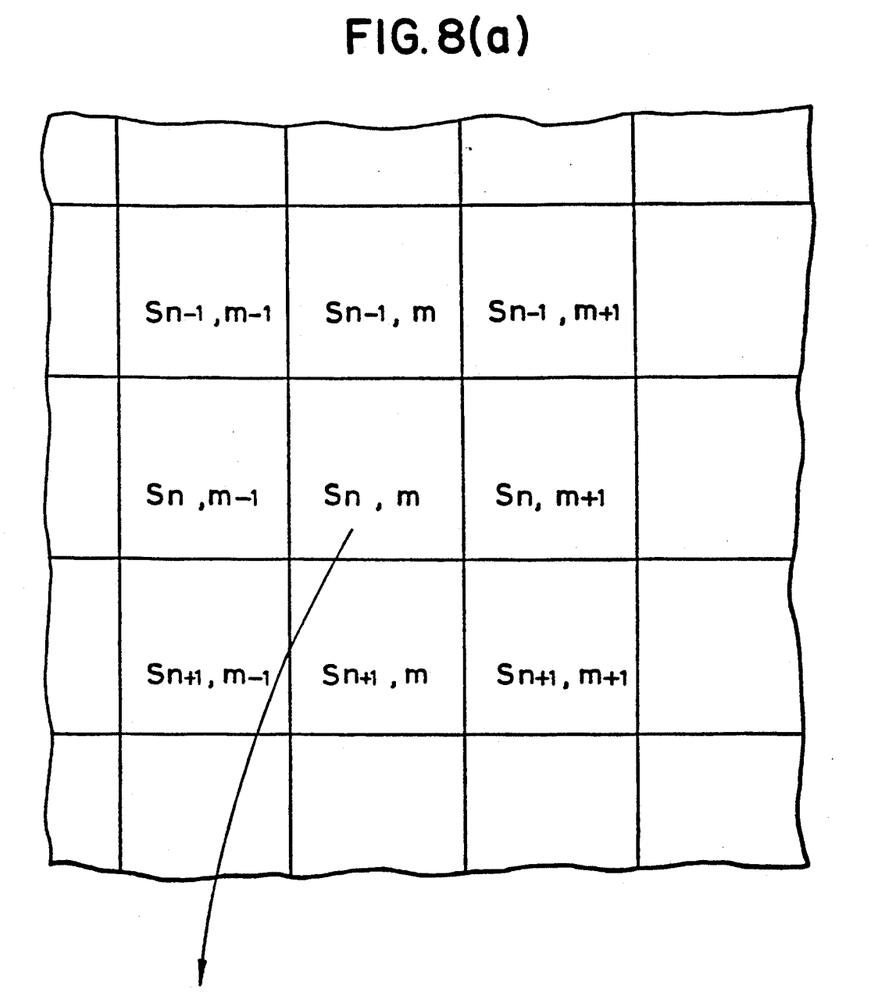
FIGS. 8(a) and 8(b) are schematic views of small block data.
Figure 8B:
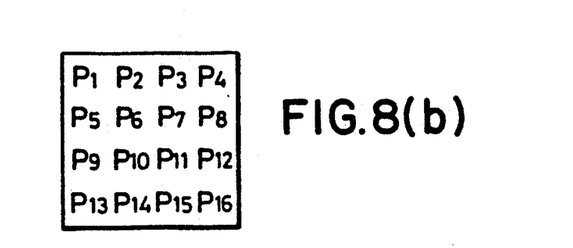

Original data read out by the reader 10 is output therefrom in units of small block data (e.g., a block consisting of $4 \times 4 = 16$ bits) shown in FIGS. 8(a) and 8(b). At this time, the reader 10 outputs, in addition to the small block data S, identification data representing whether the small block data S represents a halftone image or a binary image and address data (X,Y) of the small block data.

A determination whether the small block S output from the reader 10 is a halftone image or a binary image is performed by determining whether a value obtained by subtracting a minimum value Pmin of P1 to P16 (data representing pixel density) shown in FIG. 8(b) from a maximum value Pmax thereof is larger than a predetermined level $\alpha$. For example, assume that the density level is divided into 8 levels and $\alpha$ is set at 4. In this case, if Pmax=6 and Pmin=5, the above value is smaller than $\alpha=4$, so that the small block S is determined to be a halftone image. If Pmax=7 and Pmin=1, the value is larger than $\alpha=4$, so that the small block S is determined to be a binary image block.

In step M1 of FIG. 7, the CPU 27 initializes a small block table for forming the image area separation table of the PMEM 23. Then, in step M2, the CPU 27 inputs small block data Sn,m from the reader 10 and stores the data in the IMEM 25.

In step M3, the CPU 27 determines whether the small block data Sn,m is a halftone image on the basis of identification data added to the small block data Sn,m. If Y in step M3, the flow advances to step M4. Otherwise, the flow advances to step M8.

When the small block data Sn,m is determined to be a halftone image data in step M3 and the flow advances to step M4, the CPU 27 determines whether the current block area is a halftone area. If Y in step M4, the flow advances to step M12. Otherwise, the flow advances to step M5.

In steps M5 and M6, the CPU 27 determines whether small block data Sn−1,m and Sn,m−1 are halftone images. If both the small block data Sn−1,m and Sn,m−1 represent halftone images, the flow advances to step M7, and the CPU 27 stores a flag, which represents that the following data are halftone images, together with address data of the small block in a small block table of the PMEM 23.

When the small block data Sn,m is determined to represent a binary image in step M3 and the flow advances to step M8, the CPU 27 determines whether the current block area is a binary image area. If Y in step M8, the flow advances to step M2. Otherwise, the flow advances to step M9.

In steps M9 and M10, the CPU 27 determines whether the small block data Sn−1,m and Sn,m−1 represent binary images. If both the small block data Sn−1,m and Sn,m−1 represent binary images, the CPU 27 stores a flag, which represents that the following data are binary images, together with address data of the small block in the small block table of the PMEM 23 in step M11.

In step M12, the CPU 27 increments a small block pointer and then determines the next small block data.

The small block data output from the reader 10 is thus determined and the small block table of the PMEM 23 is formed. When the determination of all the data is completed, the image is divided into block areas on the basis of the small block table in step M14. Block division in step M14 is performed as follows.

That is, minimum data Xmin and minimum data Ymin are selected from address data (X,Y) added with the flag representing that the binary image is changed to the halftone image in one halftone area of the small block table, and then maximum data Xmax and maximum data Ymax are selected from the address data (X,Y) added with the flag representing that the halftone image is changed to the binary image. Data (Xmin,Ymin) corresponds to a start address of a halftone block area and data (Xmax,Ymax) corresponds to an end address thereof. On the basis of the start and end addresses of the halftone image block area thus obtained, the image area separation table as shown in FIG. 4 is formed in step M15.

Note that automatic division of the image area described above is merely an example, and the present invention is not limited thereto.

Note that the halftone image data is constituted by a 1-pixel/8-bit gray scale code obtained by A/D-converting the data from the reader 10. In order to transmit the halftone block which is a group of the halftone image data, the block is packet-transmitted in units of data of a predetermined number of bits. At a receiving side, the received packet data of a predetermined number of bits are assembled to reproduce the 1-pixel/8-bit halftone image block. Therefore, if a reception recording unit 70 is a so-called multilevel printer which can reproduce a halftone image in correspondence to the gray scale code by luminance modulation or pulse width modulation, the transmitted halftone image block can be reliably received and recorded.

In the above embodiment, the image area is divided into the binary image area and the halftone image area and then transmitted. However, depending on a function of a receiving apparatus, the halftone image cannot be often processed. Therefore, in another embodiment to be described below, when a destination (receiving) apparatus cannot process a multilevel code of the halftone image, the halftone image (multilevel code) is converted into a binary image ("1" and "0"), i.e., a pseudo halftone-binary signal by a dither scheme or the like, and then a character block and a binary image block are transmitted as a single binary image area. However, when the destination apparatus can receive the halftone image, a character block, a 1-pixel/1-bit binary image block, and a 1-pixel/8-bit halftone image block are transmitted.

Note that in this embodiment, data stored in the hard disk unit 50 is transmitted. Therefore, since formation of the data has been described above, a detailed description thereof will be omitted. An arrangement of this embodiment is the same as that of FIG. 1 except for a control program of the CPU 27.

Figure 9:
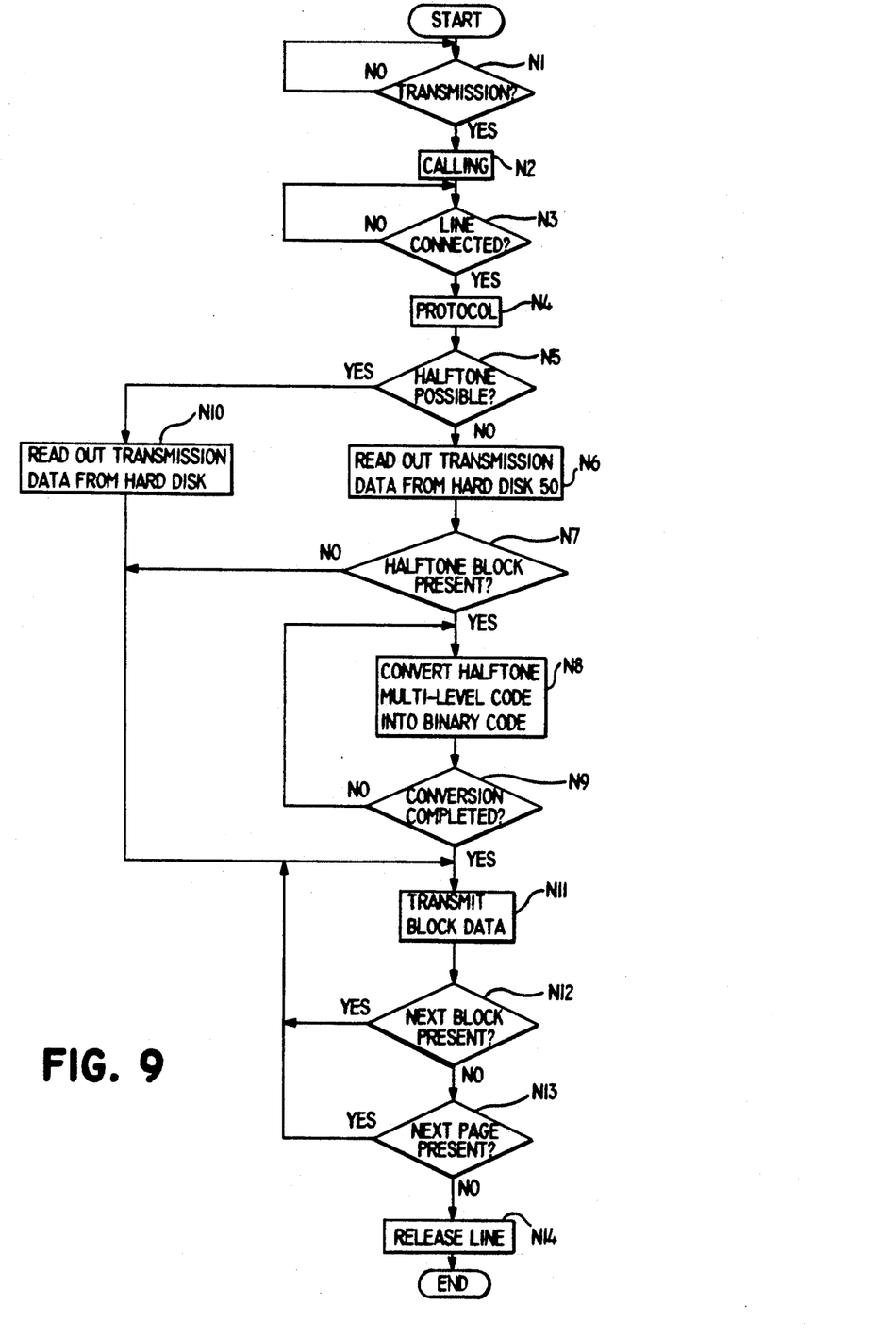
FIG. 9 is a flow chart according to another embodiment of the present invention.

FIG. 9 is a flow chart for explaining a control operation of the CPU 27 in this embodiment.

In step N1 of FIG. 9, the CPU 27 determines whether an operator inputs a transmission command by the keyboard 61. If Y in step N1, the flow advances to step N2. In step N2, dialing is performed to the line 40 on the basis of a telephone number of a transmission destination apparatus designated by the operator through the keyboard 61. Then, in step N3, the CPU 27 determines whether the line is connected to the destination apparatus before a predetermined time passes. If Y in step N4, the flow advances to step N4.

In step N4, the CPU 27 exchanges a communication procedure (protocol) with the destination apparatus, receives information representing a type of the destination apparatus (i.e., whether the destination apparatus is a G4 facsimile apparatus, a mixed-mode terminal, a Telex apparatus, or the like) and a communication function thereof (i.e., whether the destination apparatus can receive a character code, can process a halftone image, or the like) by this protocol, and determines a communication mode on the basis of this destination apparatus information. Then, the CPU 27 converts transmission data into a form which is compatible with the destination apparatus. For example, if the destination apparatus is a Class-1 G4 facsimile apparatus and hence can receive only image data, the CPU 27 develops the character code into font data, converts all the data into 1-pixel/1-bit image data, performs compression coding to the data as needed, and then transmits the data. If the destination apparatus cannot process the halftone image (halftone multilevel code), the CPU 27 converts all the halftone images into pseudo halftone binary images such as dither images and then transmits the images.

When the protocol with respect to the destination apparatus is completed in step N4, the flow advances to step N5. In step N5, the CPU 27 determines whether the destination apparatus can receive the halftone image data on the basis of the protocol result. If Y in step N5, the flow advances to step N10. In step N10, the CPU 27 reads out transmission data from the hard disk unit 50, and then in step N11, it transmits the block data. If N (NO) in step N5, the flow advances to step N6. Note that the halftone image data is transmitted by converting a parallel 8-bit code signal into a serial 8-bit code signal in the CCU 30 and then supplying it to the line.

In step N6, the CPU 27 reads out the transmission data from the hard disk 50, and in step N7, it determines whether a halftone image block is present on the basis of block constitution information of the transmission data added to the head thereof. If N in step N11, the flow advances to step N7. If Y in step N7, the flow advances to steps N8 and N9, and the halftone image is converted into a binary image. This conversion is executed when the data is stored in the hard disk 50.

When all the halftone image blocks are converted into the binary image blocks and the attributes of the blocks are changed from the halftone image to the binary image, the flow advances from step N9 to step N11.

In steps N11, N12, N13, and N14, the data is transmitted as in steps S24, S25, S26, and S27 of FIG. 5.

As described above, in this embodiment, if the destination apparatus can process the halftone image, the data is transmitted as a character block, a binary image block, and a halftone image block. However, if the destination apparatus does not have a halftone image processing function, the halftone image block is converted into the binary image block, and then the data is transmitted as the character code block and the binary image block. Therefore, the data can be transmitted in accordance with a function of the destination apparatus.

In addition, in this embodiment, the transmission data divided into three blocks, i.e., the character code block, the binary image block, and the halftone image block is converted. However, if it is known beforehand that the destination apparatus cannot process the halftone image, the image area of original read data need not be divided into the binary image area and the halftone image area. In this case, a line image such as characters is sliced by a predetermined threshold value, and a halftone image such as a photograph is binarized by a dither pattern, so that both the images can be transmitted as the binary image.

Color of a color original is sometimes separated into B, G, and R color components and then read so that one pixel is divided into the color components and then transferred. In this case, a page of a transfer document including a block consisting of these color components together with other blocks can be transferred. That is, 8 bits are assigned to each color component in one pixel, and a color block is constituted by 24 bits of three color components. Thereafter, the color block is added with an identification code (attribute) representing a color block and is then transferred. Therefore, if an apparatus at a receiving side has a color reproduction function, it performs color processing to only the color block on the basis of the respective component data and selects color materials of Y, M, and C. Then, the page can be printed out at a color printer or the like.

If the receiving apparatus does not have a color reproduction function but has only a monochromatic reproduction function, an apparatus at a transmission side converts a color block into a mere monochromatic halftone block on the basis of destination information similarly to the case wherein a halftone image is to be transmitted as described above. In this case, data of B, G, and R components are converted into data of Y, I, and Q components, and data of only lightness Y is extracted and converted into monochromatic halftone data. The resultant monochromatic halftone block is included in an originally existing monochromatic halftone block, and block boundary information (e.g., a size of the block or attribute data of every block) is deleted to convert the two blocks into a large one. Then, the large block is transferred.

Note that the present invention is not limited to the above embodiments but can be variously modified.

Industrial Applicability

As has been described above, according to the present invention, data of a variety of forms can be effectively communicated in accordance with a function of a destination apparatus.

We claim:

1. A data communication apparatus comprising:
   generating means for generating data comprising character data and color image data;
   dividing means for dividing said character data and said color image data as respective different block areas;
   communication means for communicating data of the block areas divided by said dividing means; and
   converting means for discriminating a function of a destination station and performing conversion of data of the block areas in accordance with the discrimination result,
   wherein, when it is discriminated that said destination station does not have a color image processing function, said converting means converts the color image data into data which can be processed by said destination station.

2. An apparatus according to claim 1, wherein said converting means discriminates the function on the basis of a signal from said destination station.

3. An apparatus according to claim 1, wherein said dividing means adds information indicating a type of data to data of each block.

4. A data communication apparatus comprising:
   generating means for generating mixed image data representing a binary image and a halftone image;
   dividing means for dividing the mixed image data generated by said generating means into a block of binary image data and a block of halftone image data;
   first compressing means for compressing the binary image data;
   second compressing means for compressing the halftone image data;
   adding means for adding block coding attribute data to the blocks of the binary image data and the halftone image data compressed by said first and second compressing means, respectively; and
   data communication means for communicating the data of said blocks with the block coding attribute data.

5. An apparatus according to claim 4, further comprising converting means for discriminating a function of a destination station and performing conversion of the data of said blocks in accordance with the discrimination result.

6. A method for data communication, comprising the steps of:
   generating mixed image data representing a binary image and a halftone image;
   dividing the generated mixed image data into a block of binary image data and a block of halftone image data;
   converting the binary image data into coded data in accordance with a compression process for the binary image;
   adding block coding attribute data to the blocks of coded binary image data and coded halftone image data, respectively; and
   transmitting the data of said blocks with the block coding attribute data.

7. A data communication apparatus according to claim 6, further comprising the step of discriminating a function of a destination station and performing conversion of said block in accordance with the discrimination result.

* * * * *

UNITED STATES PATENT AND TRADEMARK OFFICE
CERTIFICATE OF CORRECTION

PATENT NO. : 5,270,805
DATED : December 14, 1993
INVENTOR(S) : SHINTARO ABE, ET AL.

It is certified that error appears in the above-indentified patent and that said Letters Patent is hereby corrected as shown below:

ON TITLE PAGE

In [56] References Cited, under FOREIGN PATENT DOCUMENTS,
    insert: --60-80371  5/1985  Japan .--.

IN THE DRAWINGS

Sheet 1 of 8, FIG. 1, insert:
    --62-- and lead line to "POINTING DEVICE".

COLUMN 8

Line 23, "N4," should read --N3,--.
Line 64, "N11," should read --N7,--.

COLUMN 10

Line 63, "apparatus" should read --method--.

Signed and Sealed this

Twenty-third Day of August, 1994

Attest:

BRUCE LEHMAN

Attesting Officer          Commissioner of Patents and Trademarks